United States Patent
Yi et al.

(10) Patent No.: US 10,942,675 B2
(45) Date of Patent: Mar. 9, 2021

(54) MEMORY SYSTEM AND OPERATING METHOD THEREOF

(71) Applicant: SK hynix Inc., Gyeonggi-do (KR)

(72) Inventors: Yeong Sik Yi, Seoul (KR); Joung Young Lee, Gyeonggi-do (KR); Dae Geun Jee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 63 days.

(21) Appl. No.: 16/142,126

(22) Filed: Sep. 26, 2018

(65) Prior Publication Data

US 2019/0227746 A1 Jul. 25, 2019

(30) Foreign Application Priority Data

Jan. 19, 2018 (KR) .................. 10-2018-0007307

(51) Int. Cl.
  *G06F 3/06* (2006.01)
(52) U.S. Cl.
  CPC ............ *G06F 3/0659* (2013.01); *G06F 3/061* (2013.01); *G06F 3/0604* (2013.01); *G06F 3/0652* (2013.01); *G06F 3/0679* (2013.01)
(58) Field of Classification Search
  None
  See application file for complete search history.

(56) References Cited

U.S. PATENT DOCUMENTS

| 9,639,287 | B1* | 5/2017 | Malina | G06F 11/1441 |
| 2015/0317084 | A1* | 11/2015 | Hwang | G06F 3/064 |
| | | | | 711/154 |
| 2016/0019138 | A1* | 1/2016 | Lee | G06F 3/0685 |
| | | | | 711/103 |
| 2017/0371584 | A1* | 12/2017 | Hsieh | G06F 3/0604 |
| 2019/0087096 | A1* | 3/2019 | Ramanujan | G06F 3/068 |

FOREIGN PATENT DOCUMENTS

| KR | 101200240 | 11/2012 |
| KR | 1020140098167 | 8/2014 |
| KR | 101717081 | 3/2017 |
| KR | 1020170023734 | 3/2017 |

* cited by examiner

*Primary Examiner* — William E. Baughman
(74) *Attorney, Agent, or Firm* — IP & T Group LLP

(57) ABSTRACT

There are provided a memory system and an operating method thereof. A memory system includes: a nonvolatile memory device that operates in response to a plurality of internal commands received thereby; and a memory controller for generating and queuing the plurality of internal commands in response to a plurality of commands received from a host, and generating and storing a processing completion bitmap index corresponding to the plurality of queued internal commands.

17 Claims, 8 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0007307, filed on Jan. 19, 2018, which is incorporated herein by reference in its entirety.

BACKGROUND

1. Field of Invention

Various embodiments of the present disclosure relate to a memory system and an operating method thereof. Particularly, the embodiments relate to a memory system capable of Improving its operating speed and an operating method of the memory system.

2. Description of Related Art

The computer environment paradigm has shifted to ubiquitous computing environment, which enables computing systems to be used anywhere and anytime. As a result, use of portable electronic devices such as mobile phones, digital cameras, laptop computers, and the like have increased rapidly. Such portable electronic devices may generally include a memory system using a memory device, i.e., a data storage device. The data storage device is used as a main memory device or an auxiliary memory device of the portable electronic devices.

Since there is no mechanical driving part, a data storage device using a memory device has advantages such as excellent stability and durability, high information access speed, and low power consumption. Examples of data storage devices or memory systems having such advantages include a Universal Serial Bus (USB) memory device, memory cards having various interfaces, a Solid State Drive (SSD), and the like.

SUMMARY

Embodiments provide a memory system that can operate without blocking commands input next to a flush command even though the flush command is input in an operation of the memory system, and an operating method of the memory system.

According to an aspect of the present disclosure, there is provided a memory system including: a nonvolatile memory device configured to operate in response to a plurality of internal commands received thereby; and a memory controller configured to generate and queue the plurality of internal commands in response to a plurality of commands received from a host, and generate and store a processing completion bitmap index corresponding to the plurality of queued internal commands.

According to an aspect of the present disclosure, there is provided a memory system including: a nonvolatile memory device configured to operate in response to a plurality of internal commands received thereby, and output operation completion signals when operations of the plurality of internal commands are completed; a processor configured to generate and queue the plurality of internal commands in response to a plurality of commands received from a host, and output the plurality of queued internal commands to the nonvolatile memory device; and an operation completion check circuit configured to generate a processing completion bitmap index, based on the plurality of internal commands, and update the processing completion bitmap index in response to the operation completion signals.

According to an aspect of the present disclosure, there is provided a method for operating a memory system, the method including: receiving a plurality of commands from a host and queuing a plurality of internal commands corresponding to the plurality of commands; generating a processing completion bitmap index, based on the plurality of queued internal commands; performing an internal operation in response to each of the plurality of queued internal commands; generating an operation completion signal for a corresponding operation when that operation is completed; updating the processing completion bitmap index in response to each of the operation completion signal; and when a flush command is received from the host, outputting a response signal corresponding to the flush command to the host by checking whether operations of the plurality of commands received prior to the flush command have been completed, using the processing completion bitmap index.

According to an aspect of the present disclosure, there is provided a memory system including: a memory device; a queue configured to queue commands to be serviced through operations of the memory device; completion bitmaps respectively corresponding to the queued commands, each of the completion bitmaps initially set to have a first value; and a control circuit configured to: control the memory device to perform the operations in response to the queued commands; set one or more of the completion bitmaps to have a second value to indicate completion of one or more corresponding operations; and respond, when a flush command is queued in the queue, to the flush command based on the second value of the one or more completion bitmaps.

BRIEF DESCRIPTION OF THE DRAWINGS

Various embodiments will now be described more fully with reference to the accompanying drawings; however, elements and features of the present disclosure may be arranged or configured differently than shown or described herein. Thus, the present invention is not limited to the embodiments set forth herein. Rather, these embodiments are provided so that this disclosure is thorough and complete and fully conveys the scope of the embodiments to those skilled in the art. Throughout the specification, reference to "an embodiment" or the like is not necessarily to only one embodiment, and different references to "an embodiment" or the like are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description embodiments of the present disclosure are shown and described simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components rather than excluding such other component(s), unless the context indicates otherwise.

Figure 1:
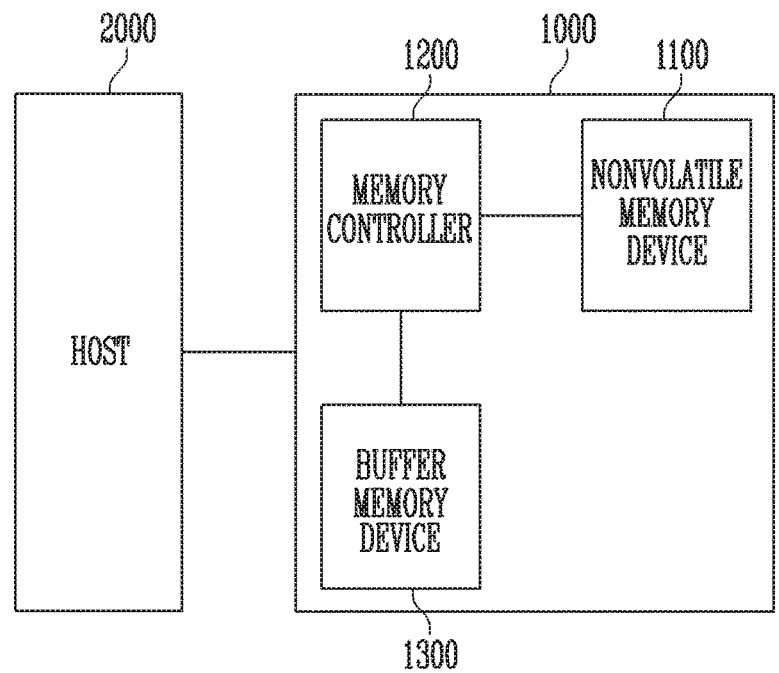
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a nonvolatile memory device 1100 that retains stored data even when power is cut off, a buffer memory device 1300 for temporarily storing data, and a memory controller 1200 for controlling the nonvolatile memory device 1100 and the buffer memory device 1300 under the control of a host 2000.

The host 2000 may communicate with the memory system 1000, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI Express (PCIe), a NonVolatile Memory Express (NVMe), a Universal Flash Storage (UFS), a Secure Digital (SD), a MultiMedia card (MMC), an Embedded MMC (eMMC), a Dual In-line Memory Module (DIMM), a Registered DIMM (RDIMM), a Load Reduced DIMM (LRDIMM), and the like.

The memory controller 1200 may control overall operations of the memory system 1000, and control data exchange between the host 2000 and the nonvolatile memory device 1100. For example, the memory controller 1200 may control the nonvolatile memory device 1100 to perform read, write, erase, and background operations in response to a command received from the host 2000. Also, when a flush command is received from the host 2000, the memory controller 1200 may check whether an operation corresponding to a command received before the flush command is received has completely performed in the nonvolatile memory device 1100, and output a signal to the host 2000 in response to the flush command. In some embodiments, the nonvolatile memory device 1100 may include a flash memory.

The memory controller 1200 may control data exchange between the host 2000 and the buffer memory device 1300 or temporarily store system data for controlling the nonvolatile memory device 1100 in the buffer memory device 1300. The buffer memory device 1300 may be used as a working memory, a cache memory or a buffer memory of the memory controller 1200. The buffer memory device 1300 may store codes and commands, which are performed by the memory controller 1200. Also, the buffer memory device 1300 may store data processed by the memory controller 1200.

The memory controller 1200 may temporarily store data input from the host 200 in the buffer memory device 1300 and then transmit the data temporarily stored in the buffer memory device 1300 to the nonvolatile memory device 1100 to be stored in the nonvolatile memory device 1100. Also, the memory controller 1200 may receive data and a logical address, which are input from the host 2000, and translate the logical address to a physical address indicating an area in which data is to be actually stored in the nonvolatile memory device 1100. Also, the memory controller 1200 may store, in the buffer memory 1300, a logical-to-physical address mapping table that establishes a mapping relationship between the logical address and the physical address.

Depending on an embodiment, the buffer memory device 1300 may include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), and the like.

Although FIG. 1 illustrates that the buffer memory device 1300 is included in the memory system 1000, the present invention is not limited thereto. That is, the memory system 1000 may not include the buffer memory device 1300.

In a PCIe type SSD, the host 2000 may define a command set having a specific format so as to describe an operation. As an example, a read command may be configured to include a logical block address (LAB), a data length, a bitmap index, a slot number, and a flag indicating whether a flush command is included. As another example, a write command may be configured in a format including a logical block address (LAB), a data length, a bitmap index, a slot number, and a flag indicating whether a flush command is included. The bitmap index records in bitmap format information on an internal operation, e.g., a read operation, a write operation or the like, corresponding to a command. The bitmap index may include a plurality of bitmaps corresponding to a plurality of internal commands.

Figure 2:
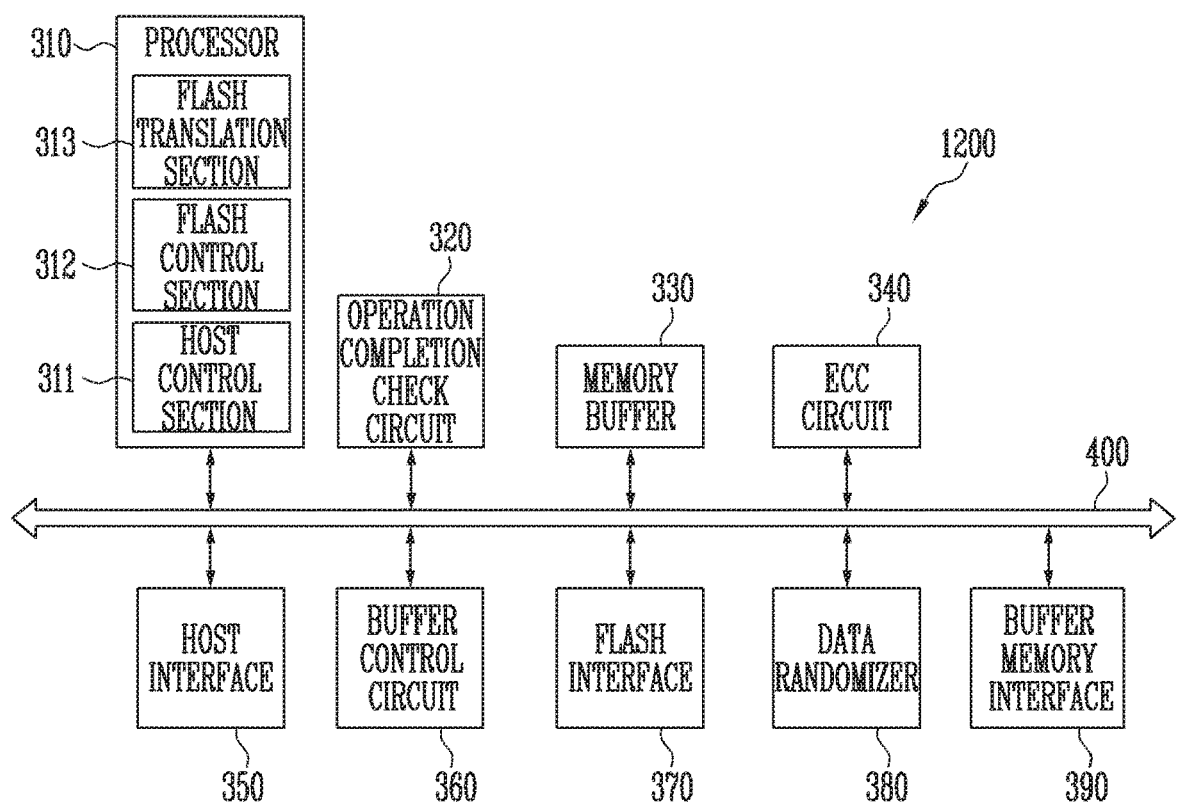
FIG. 2 is a diagram illustrating a memory controller of FIG. 1.

FIG. 2 is a diagram illustrating the memory controller of FIG. 2.

Referring to FIG. 2, the memory controller 1200 may include a processor 310, an operation completion check circuit 320, a memory buffer 330, an error correction code (ECC) circuit 340, a host interface 350, a buffer control circuit 360, a flash interface 370, a data randomizer 380, a buffer memory interface 390, and a bus 400.

The bus 400 may be configured to provide channels between components of the memory controller 1200.

The processor 310 may control overall operations of the memory controller 1200, and perform a logical operation. The processor 310 may communicate with the external host 2000 through the host interface 350, and communicate with the nonvolatile memory device 1100 through the flash interface 370. Also, the processor 310 may communicate with the buffer memory device 1300 through the buffer memory interface 390. Also, the processor 310 may control the memory buffer 330 through the buffer control circuit 360. The processor 310 may control an operation of the memory system 1000 by using the memory buffer 330 as a working memory, a cache memory or a buffer memory.

The processor 310 may generate a plurality of internal commands corresponding to a plurality of commands input from the host 2000, and queue the plurality of internal commands. Such an operation is referred to as a multi-queue. The processor 310 may sequentially transfer the plurality of queued internal commands to the nonvolatile memory device 1100.

Also, the processor 310 may generate a bitmap index configured with a plurality of bitmaps corresponding to a plurality of internal commands, and store the bitmap index in the memory buffer 330. Whenever a plurality of queued internal commands are sequentially transferred to the nonvolatile memory device 1100, the processor 310 may delete a bitmap corresponding to each such internal command as described below. Also, when a flush command is received from the host 2000, the processor 310 may generate and output a response signal corresponding to the flush command to the host 2000 when all internal commands corresponding to commands received before the flush command is received are transferred to the nonvolatile memory device 1100 and operations are completed in response to the internal commands.

The operation completion check circuit 320 may be configured to include a processing completion bitmap index configured with a plurality of processing completion bitmaps respectively corresponding to a plurality of bitmaps stored in the memory buffer 330. The plurality of processing completion bitmaps may be generated when the plurality of bitmaps are generated and stored in the memory buffer 330. In addition, when internal commands are transmitted to the nonvolatile memory device 1100 and operations are completed in response to the internal commands, performance completion information corresponding to the operation-completed internal commands are updated in a processing completion bitmap index. When all of the processing completion bitmaps, i.e., all of the performance completion information, generated before a flush command is received are updated, the operation completion check circuit 320 may output a signal in response to the flush command. The updated processing completion bitmaps may be deleted from the processing completion bitmap index after the flush command response signal is output. The operation completion check circuit 320 may be included as a component of the processor 310.

The memory buffer 330 may be used as the working memory, the cache memory or the buffer memory of the processor 310. The memory buffer 330 may store codes and commands, which are performed by the processor 310. The memory buffer 330 may include a Static RAM (SRAM) or a Dynamic RAM (DRAM). The memory buffer 330 may store a plurality of internal commands queued by the processor 310, and store a bitmap index configured with a plurality of bitmaps corresponding to a plurality of internal commands.

The ECC circuit 340 may perform error correction. The ECC circuit 340 may perform ECC encoding on data to be written in the nonvolatile memory device 1100 through the flash interface 370. The ECC-encoded data may be transferred to the nonvolatile memory device 1100 through the flash interface 370. The ECC circuit 340 may perform ECC decoding on data received from the nonvolatile memory device 1100 through the flash interface 370. As an example, the ECC circuit 340 may be included as a component of the flash interface 370 in the flash interface 370.

The host interface 350 is configured to communicate with the external host 2000 under the control of the processor 310. The host interface 350 may be configured to communicate with the host 2000, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Nonvolatile Memory Express (NVMe), a Universal Flash Storage (UFS), a Secure Digital (SD), a MultiMedia Card (MMC), an Embedded MMC (eMMC), a Dual In-line Memory Module (DIMM), a Registered DIMM (RDIMM), and a Load Reduced DIMM (LRDIMM).

The buffer control circuit 360 is configured to control the memory buffer 330 under the control of the processor 310.

The flash interface 370 is configured to communicate with the nonvolatile memory device 1100 under the control of the processor 310. The flash interface 370 may communicate a command, an address, and data with the nonvolatile memory device 1100 through a channel.

As an example, the memory controller 1200 may not include the memory buffer 330 and the buffer control circuit 360, one or both of which may be provided separately, or functions of one or both may be distributed within the memory controller 1200.

As an example, the processor 310 may control an operation of the memory controller 1200 by using codes. The processor 310 may load codes from a nonvolatile memory device (e.g., a read only memory (ROM)) provided in the memory controller 1200. As another example, the processor 310 may load codes from the nonvolatile memory device 1100 through the flash interface 370.

The data randomizer 380 may randomize data or de-randomize the randomized data. The data randomizer 380 may perform a data randomizing operation on data to be written in the nonvolatile memory device 1100 through the flash interface 370. The randomized data may be transferred to the nonvolatile memory device 1100 through the flash interface 370. The data randomizer 380 may perform a data de-randomizing operation on data received from the nonvolatile memory device 1100 through the flash interface 370. As an example, the data randomizer 380 may be included as a component of the flash interface 760.

As an example, the bus 400 of the memory controller 1200 may be divided into a control bus and a data bus. The data bus may be configured to transmit data in the memory controller 1200, and the control bus may be configured to transmit control information such as a command and an address in the memory controller 1200. The data bus and the control bus are separated so as not to interfere or influence each other. The data bus may be coupled to the host interface 350, the buffer control circuit 360, the ECC circuit 340, the flash interface 370, and the buffer memory interface 390. The control bus may be coupled to the host interface 350, the processor 310, the buffer control circuit 360, the flash interface 370, and the buffer memory interface 390. In some embodiments, the memory controller 1200 may not include the buffer memory interface 390, which may be provided separately or its functions distributed within the memory controller 1200.

The buffer memory interface 390 may be configured to communicate with the buffer memory device 1300 under the control of the processor 310. The buffer memory interface 390 may communicate a command, an address, and data with the buffer memory device 1300 through a channel.

The memory system 1000 may receive a write command, write data, and a logical address from the host 2000. The memory controller 1200 may allocate a physical storage space, i.e., a memory block or page of the nonvolatile memory device 1100, in which the write data is to be stored, in response to the write command. In other words, the memory controller 1200 may map a physical address corresponding to the logical address in response to the write command. The physical address may be referred to as a flash logical address to be distinguished from a host physical address. The physical address may correspond to the physical storage space of the nonvolatile memory device 1100, in which the write data input from the host 2000 is to be stored.

The memory system 1000 may store, in a memory block of the nonvolatile memory device 1100, mapping information between the logical address and the physical address, i.e., physical-to-logical address mapping information. The memory block that stores the physical-to-logical address mapping information may be referred to as a system block.

When the memory system 1000 is booted, logical-to-physical address mapping information stored in the nonvolatile memory device 110 may be loaded to the buffer memory device 1300 or the memory buffer 330. Also, when it is required to check logical-to-physical address mapping information stored in the nonvolatile memory device 110, the memory system 1000 may read the logical-to-physical address mapping information from the nonvolatile memory device 1100 and store the read logical-to-physical address mapping information in the buffer memory device 1300 or the memory buffer 330. The buffer memory device 1300 or the memory buffer 330 may be individually or collectively referred to as a controller buffer memory.

As another example, when the memory system 1000 receives a write command, write data, and a logical address from the host 2000, the memory controller 1200 may allocate a physical storage space of the nonvolatile memory device 1100, in which the write data is to be stored, in response to the write command. That is, the processor 310 may map a physical address corresponding to the logical address in the write command. Mapping information between a newly generated logical address and the physical address, i.e., physical-to-logical address mapping information, may be updated in the buffer memory device 1300 or the memory buffer 330. As described above, the physical address indicating data storage space in the nonvolatile memory device 1100 may be referred to as a flash physical address.

The memory system 1000 may receive a read command and a logical address from the host 2000. The memory system 1000 may check a physical address corresponding to the logical address from the logical-to-physical address mapping information stored in the nonvolatile memory device 1100 in response to the read command, read data stored in a memory area corresponding to the physical address, and output the read data to the host 2000.

The processor 310 may include a host control section 311, a flash control section 312, and a flash translation section 313.

The host control section 311 may control data transmission between the host 2000, and the host interface 350 and the controller memory buffer, i.e., the memory buffer 330 or the buffer memory device 1300. As an example, the host control section 311 may control an operation of buffering data input from the host 2000 to the memory buffer 330 or the buffer memory device 1300 via the host interface 350. As another example, the host control section 311 may control an operation of outputting data buffered to the memory buffer 330 or the buffer memory device 1300 to the host 2000 via the host interface 350.

The flash control section 312 may control an operation of transmitting data buffered in the memory buffer 330 or the buffer memory device 1300 in a write operation to the nonvolatile memory device 1100 and programming the data. As another example, the flash control section 312 may control an operation of buffering, to the memory buffer 330 or the buffer memory device 1300, data read and output from the nonvolatile memory device 1100 in a read operation.

The flash translation section 313 may map a physical address corresponding to a logical address input from the host 2000 in a data write operation. Data may be written in a storage space of the nonvolatile memory device 1100, which corresponds to the mapped physical address. The flash translation section 313 may check the physical address mapped to the logical address input from the host 2000 in the data write operation, and transmit the physical address to the flash control section 312. The flash control section 312 may read data from the storage space of the nonvolatile memory device 1100, which corresponds to the physical address. The physical address indicating a storage space of the nonvolatile memory device 1100 may be referred to as a flash physical address to be distinguished from the host physical address.

Figure 3:
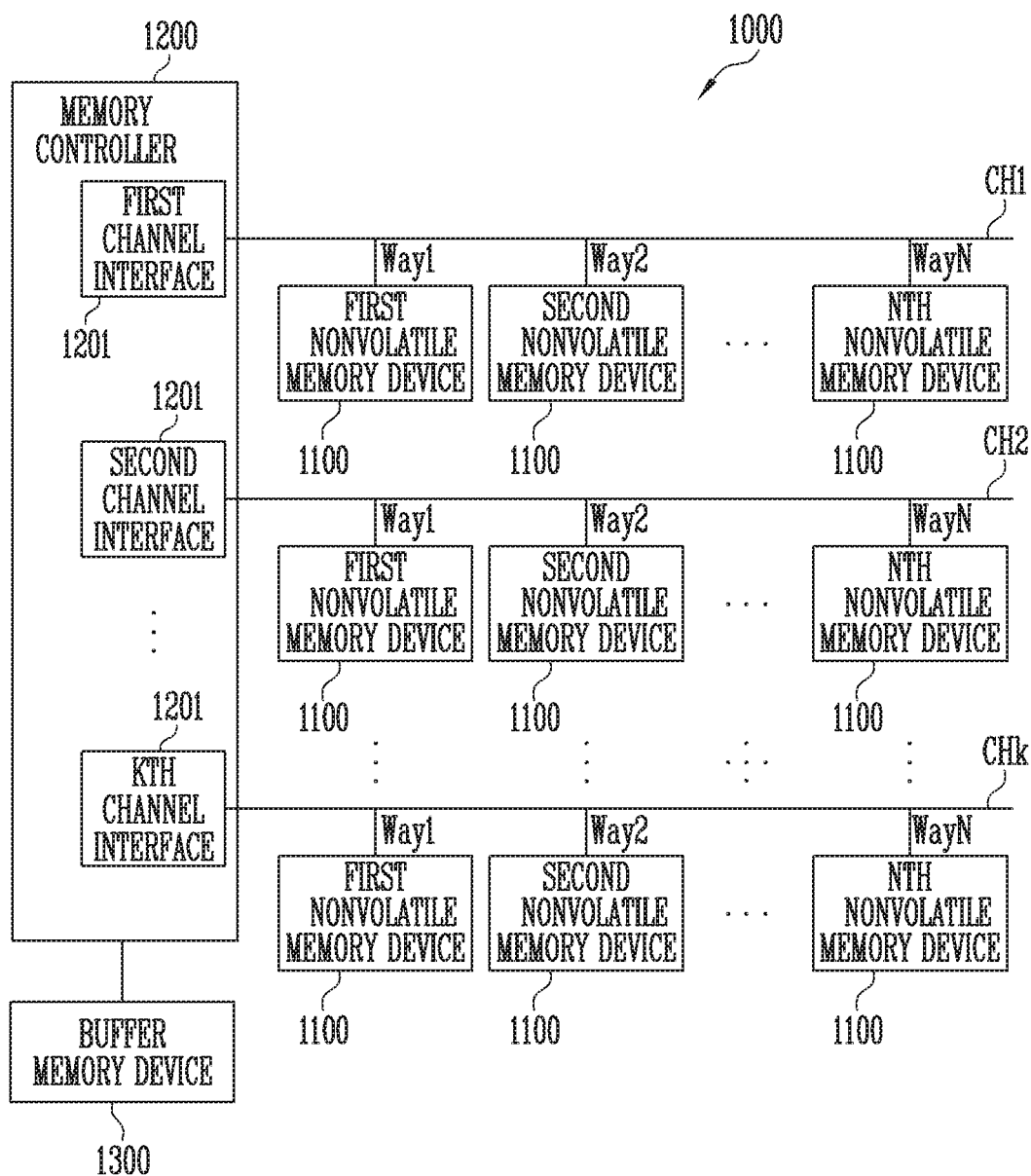
FIG. 3 is a diagram illustrating a memory system according to another embodiment of the present disclosure.

FIG. 3 is a diagram illustrating a memory system according to another embodiment of the present disclosure. Specifically, FIG. 3 illustrates a memory system 1000 including a plurality of nonvolatile memory devices 1100 coupled to a memory controller 1200 through a plurality of channels CH1 to CHk.

Referring to FIG. 3, the memory controller 1200 may communicate with the plurality of nonvolatile memory devices 1100 through the plurality of channels CH1 to CHk. The memory controller 1200 may include a plurality of channel interfaces 1201, and each of the plurality of channels CH1 to CHk may be coupled to a respective one of the plurality of channel interfaces 1201. As an example, a first channel CH1 may be coupled to a first channel interface 1201, a second channel CH2 may be coupled to a second channel interface 1201, and a kth channel CHk may be coupled to a kth channel interface 1201. Each of the plurality of channels CH1 to CHk may be coupled to one or more nonvolatile memory devices 1100. In addition, nonvolatile memory devices 1100 coupled to different channels may operate independently. In other words, a nonvolatile memory device 1100 coupled to the first channel CH1 and a nonvolatile memory device 1100 coupled to the second channel CH may operate independently. As an example, the memory controller 1200 may communicate, in parallel, data or a command with a nonvolatile memory device 1100 coupled to the second channel CH2 through the second channel CH2 while communicating data or a command with a nonvolatile memory device 1100 coupled to the first channel CH1 through the first channel CH1.

Each of the plurality of channels CH1 to CHk may be coupled to a plurality of nonvolatile memory devices 1100. Each of the plurality of nonvolatile memory devices 1100 coupled to one channel may constitute a different way, i.e., Way1, Way2, . . . , WayN. Accordingly, N nonvolatile memory devices 1100 may be coupled to one channel to constitute N different ways. That is, first to Nth nonvolatile memory devices 1100 may be coupled to the first channel CH1, the first nonvolatile memory device 1100 may constitute a first way Way1, the second nonvolatile memory device 1100 may constitute a second way Way2, and the Nth nonvolatile memory device 1100 may constitute an Nth way WayN. Alternatively, unlike the arrangement shown FIG. 2, two or more nonvolatile memory devices 1100 coupled to the same channel may constitute one way Way.

The nonvolatile memory devices 1100 coupled to, and sharing, the same channel cannot simultaneously communicate data or a command with the memory controller 1200 but may sequentially communicate data or a command with the memory controller 1200. For example, while the memory controller 1200 is transmitting data to the first Way1 nonvolatile memory device 1100 of the first channel CH1 through the first channel CH1, the second to Nth nonvolatile memory devices 1100 constituting the second to Nth ways Way2 to WayN of the first channel CH1 cannot communicate data or a command with the memory controller 1200 through the first channel CH1. In other words, while any one of the first to Nth nonvolatile memory devices 1100 that share the first channel CH1 is occupying the first channel CH1, the other nonvolatile memory devices 1100 coupled to the first channel CH1 cannot use the first channel CH1.

However, the first Way1 nonvolatile memory device 1100 of the first channel CH1 and a first Way1 nonvolatile memory device 1100 of a second channel CH2 may independently communicate with the memory controller 1200. In other words, at the same time when the memory controller 1200 communicates data with the first Way1 nonvolatile memory device 1100 of the first channel CH1 through the first channel CH1 and the first channel interface 1201, the memory controller 1200 may communicate data with the first Way1 nonvolatile memory device 1100 of the second channel CH2 through the second channel and the second channel interface 1201.

Figure 4:
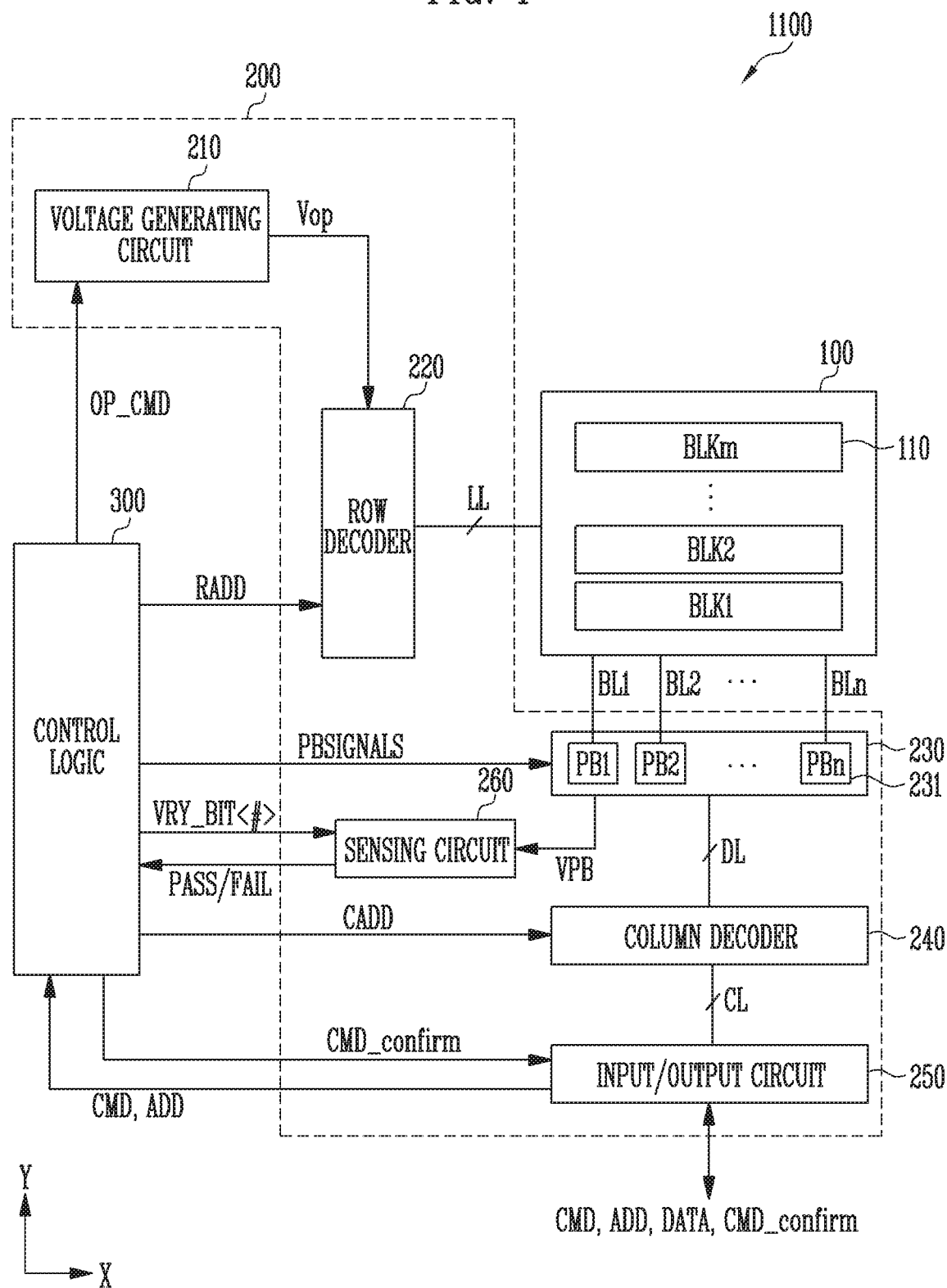
FIG. 4 is a diagram illustrating a nonvolatile memory device of FIG. 1.

FIG. 4 is a diagram illustrating the nonvolatile memory device of FIG. 1.

Referring to FIG. 4, the nonvolatile memory device 1100 may include a memory cell array 100 for storing data. The nonvolatile memory device 1100 may include peripheral circuits 200 configured to perform a program operation for storing data in the memory cell array 100, a read operation for outputting the stored data, and an erase operation for erasing the stored data. The nonvolatile memory device 1100 may include control logic 300 for controlling the peripheral circuits 200 under the control of the memory controller 1200 (of FIG. 1).

The memory cell array 100 may include a plurality of memory blocks MB1 to MBm (m is a positive integer) 110. Local lines LL and bit lines BL1 to BLn (n is a positive integer) may be coupled to the memory blocks MB1 to MBm 110. For example, the local lines LL may include a first select line, a second select line, and a plurality of word lines arranged between the first and second select lines. Also, the local lines LL may further include dummy lines arranged between the first select line and the word lines and between the second select line and the word lines. Here, the first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks MB1 to MBm 110, respectively, and the bit lines BL1 to BLn may be commonly coupled to the memory blocks MB1 to MBm 110. The memory blocks MB1 to MBm 110 may be implemented in a two-dimensional or three-dimensional structure. For example, memory cells may be arranged in a direction parallel to a substrate in memory blocks 110 having a two-dimensional structure. For example, memory cells may be arranged in a direction vertical to a substrate in memory blocks 110 having a three-dimensional structure.

The peripheral circuits 200 may be configured to perform program, read, and erase operations of a selected memory block 110 under the control of the control logic 300. For example, the peripheral circuits 200, under the control of the control logic 300, may supply verify and pass voltages to the first select line, the second select line, and the word lines, selectively discharge the first select line, the second select line, and the word lines, and verify memory cells coupled to a selected word line among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer an internal command CMD and address ADD, which are received from the memory controller 1200 (of FIG. 1), to the control logic 300, or exchange data DATA with the column decoder 240.

The sensing circuit 260, in a read operation and a verify operation, may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the page buffer control signals PBSIGNALS, and the permission bit VRY_BIT<#> in response to the internal command CMD and the address ADD. Also, the control logic 300 may determine whether the verify operation has passed or failed in response to the pass or fail signal PASS or FAIL.

In an operation of the non-volatile memory device 1100, each memory block 110 may be a unit of an erase operation. In other words, a plurality of memory cells included in the memory block 110 are simultaneously erased, and may not be selectively erased.

The control logic 300 may output an operation completion signal CMD_confirm when the internal command CMD is normally received from the outside or when an operation, e.g., a program, read or erase operation corresponding to the internal command CMD is completed.

Figure 5:
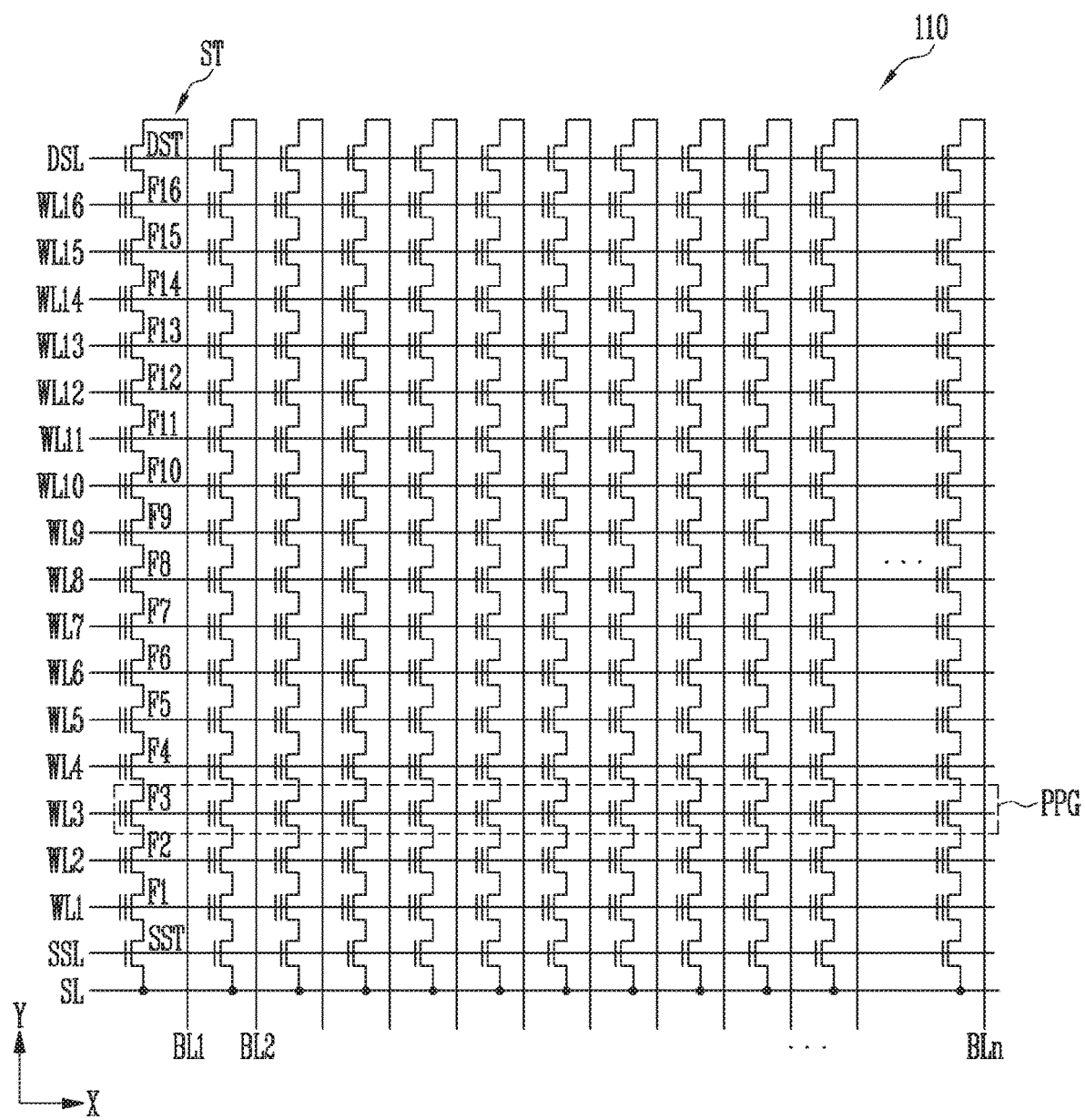
FIG. 5 is a diagram illustrating a memory block of FIG. 4.

FIG. 5 is a diagram illustrating the memory block of FIG. 4.

Referring to FIG. 5, a plurality of word lines arranged in parallel to one another between a first select line and a second select line may be coupled to the first memory block 110. Here, the first select line may be a source select line SSL, and the second select line may be a drain select line DSL. More specifically, the first memory block 110 may include a plurality of strings ST coupled between bit lines BL1 to BLn and a source line SL. The bit lines BL1 to BLn may be coupled to the strings ST, respectively, and the source line SL may be commonly coupled to the strings ST. The strings ST may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and more than the sixteen memory cells F1 to F16 shown in the drawing may be included in one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST in different strings ST may be coupled to the source select line SSL, gates of drain select transistors DST in different strings ST may be coupled to the drain select line DSL, gates of the memory cells F1 to F16 in different strings ST may be coupled to a plurality of word lines WL1 to WL16. A group of memory cells coupled to the same word line among the memory cells in different strings ST may be a physical page PPG. Therefore, physical pages PPG of which number corresponds to that of the word lines WL1 to WL16 may be included in the first memory block 110.

One memory cell MC may store data of one bit. This is generally called as a single level cell (SLC). In this case, one physical page PPG may store one logical page (LPG) data. The one LPG data may include data bits of which number corresponds to that of cells in one physical page PPG. In addition, one memory cell MC may store data of two or more bits. This is generally called as a multi-level cell (MLC). In this case, one physical page PPG may store two or more LPG data.

When the memory cell stores data of two bits, one physical page PPG may include two pages PG. One page PG may store one LPG data. One memory cell may have any one of a plurality of threshold voltages according to data, and a plurality of pages PG in one physical page PPG may be expressed using a difference in threshold voltage.

A plurality of memory cells in one physical page PPG may be simultaneously programmed. In other words, the nonvolatile memory device 1100 may perform a program operation in units of physical pages PPG. A plurality of memory cells in one memory block may be simultaneously erased. In other words, the nonvolatile memory device 1100 may perform an erase operation in units of memory blocks 110. As an example, in order to update a portion of data stored in one memory block 110, after data to be updated among the entire data is modified by reading the entire data stored in the memory block 110, the entire data may be again programmed in another memory block 110.

Figure 6:
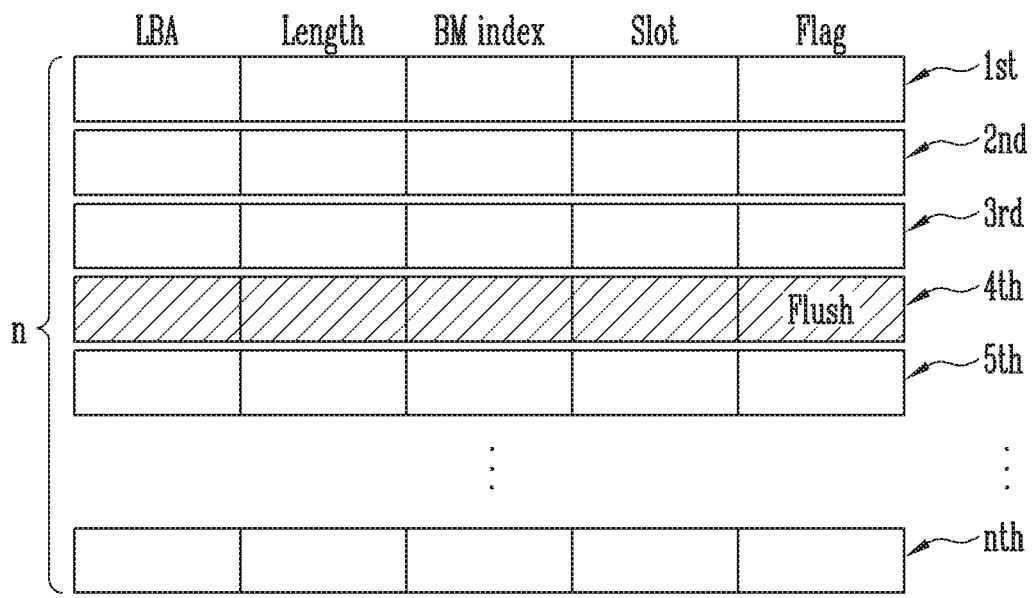
FIG. 6 is a diagram illustrating internal commands according to commands input from a host.

FIG. 6 is a diagram illustrating internal commands according to commands input from the host.

Figure 7:
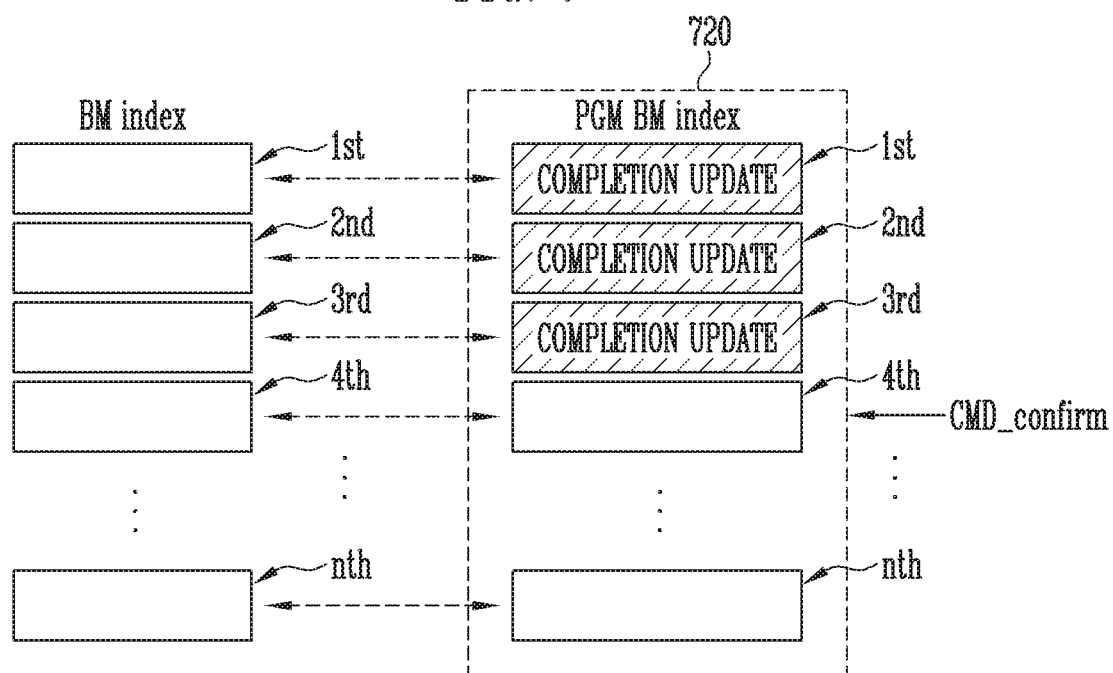
FIG. 7 is a diagram illustrating an operation completion check circuit of FIG. 2.

FIG. 7 is a diagram illustrating the operation completion check circuit of FIG. 2.

Referring to FIG. 7, when internal commands are generated and queued by the processor 310 (of FIG. 2), the operation completion check circuit 320 (of FIG. 2) generates and stores a processing completion bitmap index PGM BM Index 720 configured with processing completion bitmaps with reference to a bitmap index BM Index of the queued internal commands. That is, the operation completion check circuit 320 generates and stores a processing completion bitmap index PGM BM index 720 configured with processing completion bitmaps respectively corresponding to the bitmap index BM Index of the internal commands. For example, the operation completion check circuit 320 generates first to nth processing completion bitmaps in the PGM BM Index respectively corresponding to first to nth bitmaps in the BM Index, as shown in FIG. 7. Also, when an operation completion signal CMD_confirm is received from the nonvolatile memory device 1100 (of FIG. 1), the operation completion check circuit 320 may update, in the PGM BM index, processing completion bitmaps (e.g., the first to third processing completion bitmaps) corresponding to the received operation completion signal CMD_confirm from an initial state to a completion state.

Figure 8:
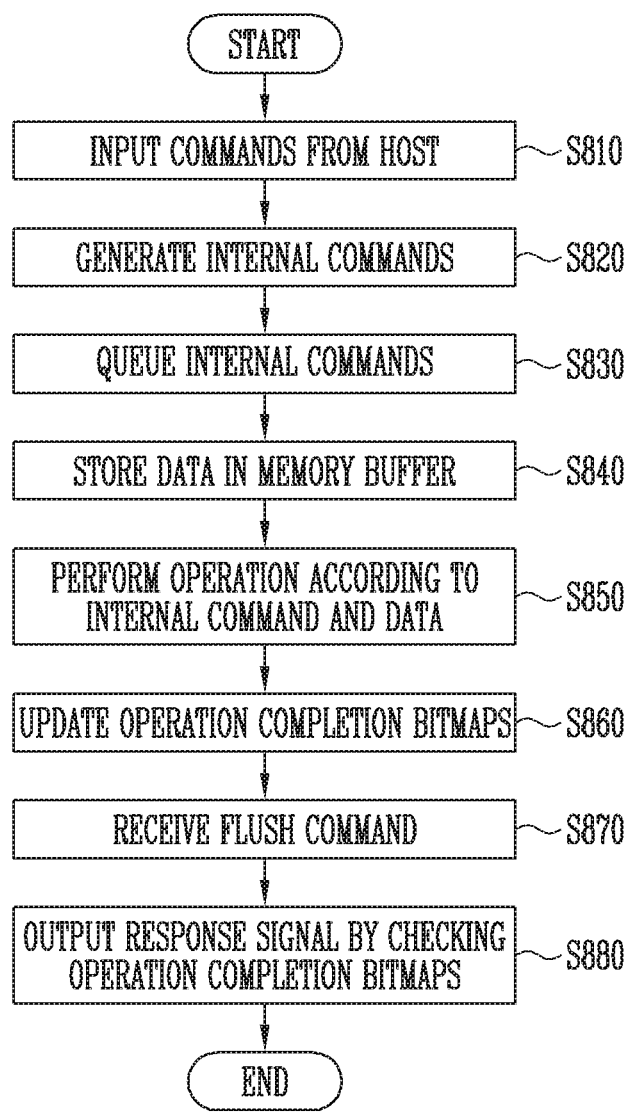
FIG. 8 is a flowchart illustrating an operating method of the memory system according to an embodiment of the present disclosure.

FIG. 8 is a flowchart illustrating an operating method of the memory system according to an embodiment of the present disclosure.

The operating method of the memory system according to an embodiment of the present disclosure will be described as follows with reference to FIGS. 1 to 8.

By way of example but not limitation, a situation in which a plurality of write commands and a flush command are consecutively received from the host 2000, and new write commands are received after the flush command is received is described.

When commands from the host 2000 are input to the memory controller 1200 at step S810, the processor 310 of the memory controller 1200 determines whether each received command corresponds to a write, read or erase operation, or a flush command. When a received command is determined to correspond to a write, read or erase operation, the processor 310 generates an internal command corresponding to the received command at step S820. The processor 310 may generate a plurality of internal commands by repeatedly performing the step S820 on each of the plurality of commands consecutively received from the host 2000, and the plurality of generated internal commands may be queued in the memory buffer 330 based on their orders of priority at step S830.

The plurality of queued internal commands will be described as follows with reference to FIG. 6.

The plurality of internal commands may be sequentially queued based on their orders of priority. In an embodiment of the present disclosure, a maximum of n internal commands may be queued, where n is determined by the system capabilities including the size of the memory buffer 330.

Each internal command may be configured in a format including a logical block address LAB, a data length Length, a bitmap index BM Index, a slot number Slot, and a flag Flag indicating whether the corresponding command from the host is a flush command.

When internal commands are generated and queued by the processor 310, the operation completion check circuit 320 generates and stores a processing completion bitmap index PGM BM Index configured with processing completion bitmaps with reference to the bitmaps of the bitmap index BM Index of the queued internal commands. That is, the operation completion check circuit 320 generates and stores the processing completion bitmap index PGM BM Index 720 configured with first to nth processing completion bitmaps respectively corresponding to first to nth bitmaps of the bitmap index BM Index of the internal commands, as shown in FIG. 7.

Data received together when the commands are received from the host 2000 may be stored in the memory buffer 330 at step S840. In another embodiment, the data received together when the commands are received from the host 2000 may be stored in the buffer memory device 1300.

The flash control section 312 may control a program operation by sequentially transmitting the queued internal commands to the nonvolatile memory device 1100 based on their orders of priority, and transmitting the data buffered to the memory buffer 320 or the buffer memory device 1300. The nonvolatile memory device 1100 performs a program operation according to the received internal command and the data at step S850.

The nonvolatile memory device 1100 outputs an operation completion signal CMD_confirm when an internal operation corresponding to the received internal command, i.e., the program operation is completed.

When the operation completion signal CMD_confirm is received from the nonvolatile memory device 1100, the operation completion check circuit 320 updates processing completion bitmaps (e.g., the first to third processing completion bitmaps) corresponding to the received operation completion signal CMD_confirm from an initial state to a completion state at step S860, as shown in FIG. 7.

If a flush command is received from the host 2000 after a plurality of write commands are received at step S870, the processor 310 generates and queues an internal command corresponding to the flush command. The internal command corresponding to the flush command has a flag data Flush in the Flag field representing that the corresponding host-originated command is the flush command as shown in FIG. 6.

The operation completion check circuit 320 generates in the PGM BM Index a processing completion bitmap corresponding to the flush command with reference to a bitmap corresponding to the flush command in the BM Index, and checks update states of processing completion bitmaps generated prior to the processing completion bitmap corresponding to the flush command. When the processing completion bitmaps generated prior to the processing completion bitmap corresponding to the flush command are all updated to the completion state, the operation completion check circuit 320 generates a signal in response to the flush command and outputs the response signal to the host 2000 at step S880.

New commands and data may be received from the host 2000 even in a period of time between when the flush command is received and when the response signal to the flush command is output to the host 2000. The new commands and the data, which are received in that time period, may be stored by generating and queuing internal commands and buffering data to the memory buffer 320 or the buffer memory device 1300 through the steps S810 to S840. Accordingly although a flush command is received, operations of the memory system on commands received after the flush command are consecutively performed, so that the operating speed of the memory system can be improved.

Figure 9:
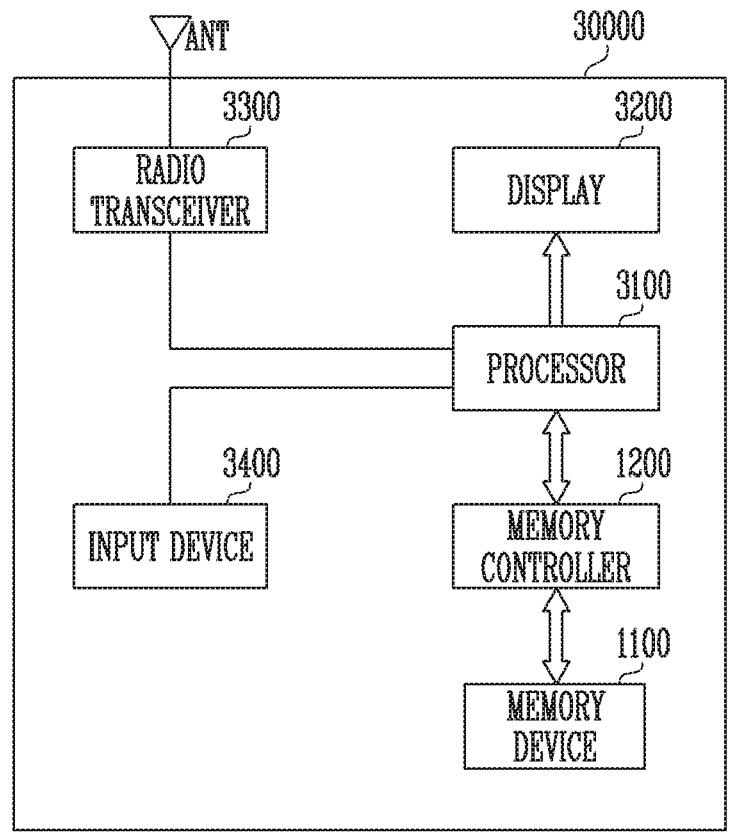
FIG. 9 is a diagram illustrating another embodiment of the memory system.

FIG. 9 is a diagram illustrating another embodiment of the memory system.

Referring to FIG. 9, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the semiconductor memory device 1100. Also, the radio transceiver 3300 may convert a signal output from the processor 3100 into a radio signal, and output the converted radio signal to an external device through the antenna ANT. An input device 3400 capable of inputting a control signal for controlling an operation of the processor 3100 or data to be processed by the processor 3100 may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100. Also, the memory controller 1200 may be implemented with the memory controller shown in FIG. 2.

Figure 10:
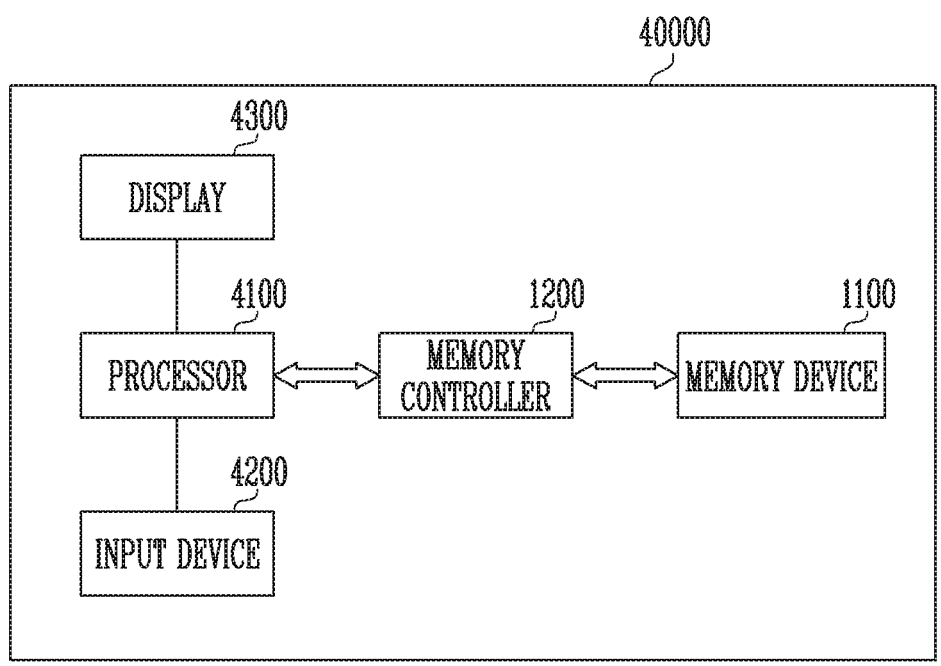
FIG. 10 is a diagram illustrating another embodiment of the memory system.

FIG. 10 is a diagram illustrating another embodiment of the memory system.

Referring to FIG. 10, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100. Also, the memory controller 1200 may be implemented with the memory controller shown in FIG. 2.

Figure 11:
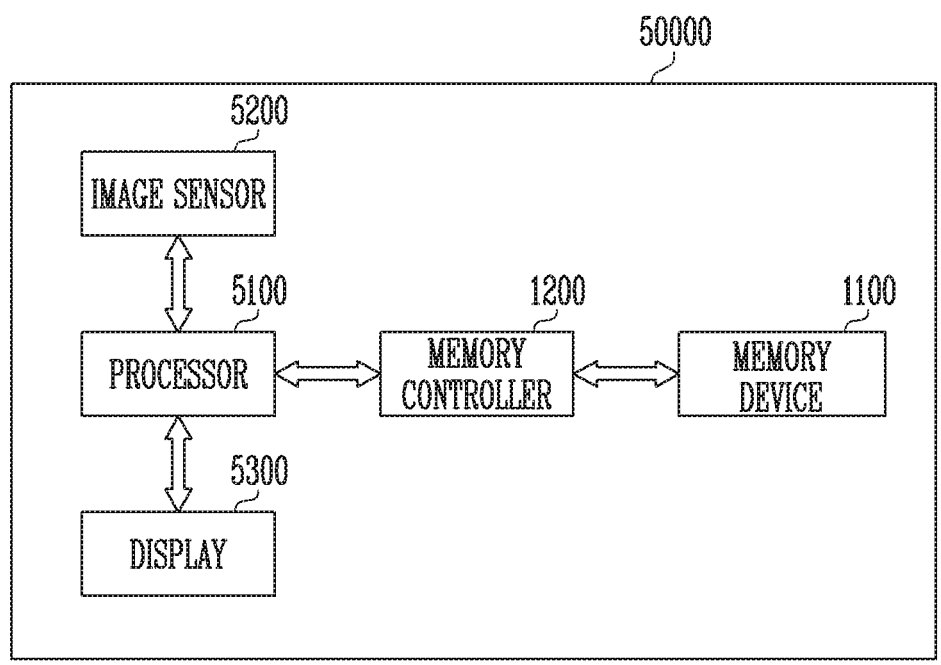
FIG. 11 is a diagram illustrating another embodiment of the memory system.

FIG. 11 is a diagram illustrating another embodiment of the memory system.

Referring to FIG. 11, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, which may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100. Also, the memory controller 1200 may be implemented with the memory controller shown in FIG. 2.

Figure 12:
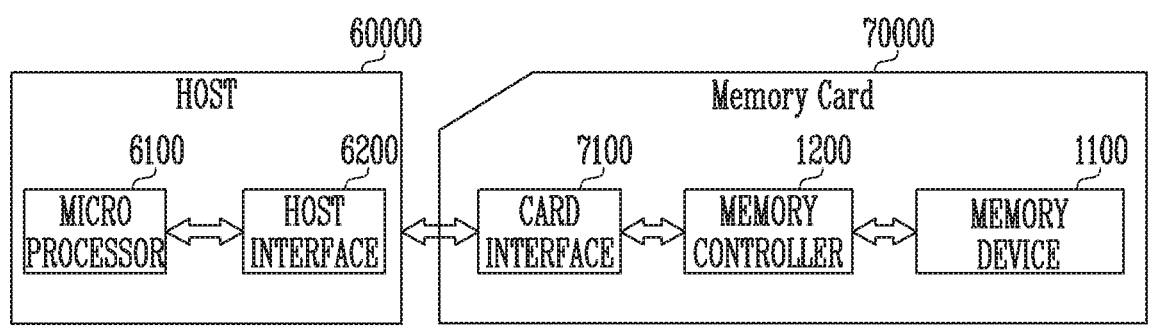
FIG. 12 is a diagram illustrating another embodiment of the memory system.

FIG. 12 is a diagram illustrating another embodiment of the memory system.

Referring to FIG. 12, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto. In addition, the memory controller 1200 may be implemented with the memory controller shown in FIG. 2.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. Here, the card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to embodiments of the present disclosure, although a flush command is input in an operation of the memory system, the memory system operates without blocking commands input after the flush command. Thus, the memory system can continuously operate, and accordingly, the operating speed of the memory system can be improved.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
a nonvolatile memory device configured to perform a plurality of internal operations in response to a plurality of internal commands received thereby; and
a memory controller configured to generate the plurality of internal commands in response to a plurality of commands received from a host, to generate a processing completion bitmap index corresponding to the plurality of internal commands, to update the processing completion bitmap index when the plurality of internal commands are transmitted to the nonvolatile memory device and the plurality of internal operations are completed in response to the plurality of internal commands, and to output, in response to a reception of a flush command from the host, a response signal corresponding to the flush command to the host based on the processing completion bitmap index,
wherein the memory controller outputs the response signal, when operations of the plurality of internal commands generated before the flush command is received from the host have all been completed by checking the processing completion bitmap index.

2. The memory system of claim 1, wherein the memory controller controls the nonvolatile memory device by sequentially outputting the plurality of internal commands.

3. The memory system of claim 1, wherein the nonvolatile memory device outputs an operation completion signal to the memory controller when the internal operations are completed.

4. The memory system of claim 3, wherein the memory controller stores information on the internal commands of which operations have been completed by updating the processing completion bitmap index in response to the operation completion signal.

5. The memory system of claim 4, wherein, when the flush command is received from the host, the memory controller determines whether the operations of the plurality of internal commands generated before the flush command is received have all been completed by checking the processing completion bitmap index.

6. The memory system of claim 5, wherein, after the flush command is received, the memory controller generates new internal commands in response to new commands received from the host before the response signal is output.

7. The memory system of claim 1, wherein the memory controller includes:

a processor configured to generate the plurality of internal commands in response to the plurality of commands received from the host; and an operation completion check circuit configured to generate the processing completion bitmap index.

8. The memory system of claim 7, wherein the memory controller further includes a memory buffer configured to store the plurality of internal commands and buffer data received from the host.

9. The memory system of claim 7, wherein the operation completion check circuit generates the processing completion bitmap index configured with a plurality of processing completion bitmaps corresponding to bitmaps of the plurality of internal commands respectively.

10. The memory system of claim 9, wherein the operation completion check circuit receives an operation completion signal from the nonvolatile memory device, and updates, to a completion state, a processing completion bit map corresponding to the operation completion signal among the plurality of processing completion bitmaps.

11. A memory system comprising:
a nonvolatile memory device configured to operate in response to a plurality of internal commands received thereby, and output operation completion signals when operations of the plurality of internal commands are completed;
a processor configured to generate the plurality of internal commands in response to a plurality of commands received from a host, and output the plurality of internal commands to the nonvolatile memory device; and
an operation completion check circuit configured to generate a processing completion bitmap index based on the plurality of internal commands, to update the processing completion bitmap index in response to the operation completion signals, and to output, in response to a reception of a flush command from the host, a response signal corresponding to the flush command to the host based on the processing completion bitmap index,
wherein the operation completion check circuit outputs the response signal, when the operations of the plurality of internal commands generated before the flush command is received from the host have all been completed by checking the processing completion bitmap index.

12. The memory system of claim 11, wherein the operation completion check circuit generates the processing completion bitmap index configured with a plurality of processing completion bitmaps corresponding to bitmaps of the plurality of internal commands respectively.

13. The memory system of claim 12, wherein the operation completion check circuit updates the plurality of processing completion bitmaps to a completion state in response to the operation completion signals.

14. The memory system of claim 13, wherein, when the flush command is received from the host, the operation completion check circuit determines whether the operations of the plurality of internal commands generated before the flush command is received have all been completed by checking the processing completion bitmap index.

15. A method for operating a memory system, the method comprising:
receiving a plurality of commands from a host and generating a plurality of internal commands corresponding to the plurality of commands;
generating a processing completion bitmap index based on the plurality of internal commands;
performing an internal operation in response to each of the plurality of internal commands;
generating an operation completion signal for a corresponding operation when that operation is completed;
updating the processing completion bitmap index in response to each of the operation completion signals; and
when a flush command is received from the host, outputting a response signal corresponding to the flush command to the host by checking whether operations of the plurality of commands received prior to the flush command have been completed using the processing completion bitmap index,
wherein the outputting of the response signal outputs the response signal, when operations of the plurality of internal commands generated before the flush command is received from the host have all been completed by checking the processing completion bitmap index.

16. The method of claim 15, wherein the processing completion bitmap index is configured with a plurality of processing completion bitmaps corresponding to bitmaps of the plurality of internal commands respectively,
wherein a processing completion bitmap corresponding to the operation completion signal among the plurality of processing completion bitmaps is updated to a completion state in response to the operation completion signal.

17. The method of claim 15, wherein, when the flush command is received, and new commands are received from the host before the response signal is output, new internal commands respectively corresponding to the new commands are generated.

* * * * *